(12) United States Patent
Levit et al.

(10) Patent No.: US 7,771,810 B2
(45) Date of Patent: Aug. 10, 2010

(54) HONEYCOMB FROM PAPER HAVING A HIGH MELT POINT THERMOPLASTIC FIBER

(75) Inventors: Mikhail R. Levit, Glen Allen, VA (US); Subhotosh Khan, Midlothian, VA (US); Gary Lee Hendren, Richmond, VA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 367 days.

(21) Appl. No.: 11/639,548

(22) Filed: Dec. 15, 2006

(65) Prior Publication Data

US 2008/0145598 A1 Jun. 19, 2008

(51) Int. Cl.
*B32B 3/12* (2006.01)

(52) U.S. Cl. .................. 428/116; 428/118; 428/902; 428/34.2; 428/35.7; 162/157.1; 162/157.3

(58) Field of Classification Search .................. None
See application file for complete search history.

(56) References Cited

U.S. PATENT DOCUMENTS

| | | | |
|---|---|---|---|
| 2,999,788 A | 9/1961 | Morgan | |
| 3,519,510 A | 7/1970 | Ardolino et al. | |
| 3,756,908 A | 9/1973 | Gross | |
| 3,767,756 A | 10/1973 | Blades | |
| 3,869,429 A | 3/1975 | Blades | |
| 3,869,430 A | 3/1975 | Blades | |
| 4,118,372 A | 10/1978 | Schaefgen | |
| 4,698,267 A | 10/1987 | Tokarsky | |
| 4,729,921 A | 3/1988 | Tokarsky | |
| 5,026,456 A | 6/1991 | Hesler et al. | |
| 5,110,896 A | 5/1992 | Waggoner et al. | |
| 5,137,768 A | 8/1992 | Lin | |
| 5,217,556 A | 6/1993 | Fell | |
| 5,223,094 A | 6/1993 | Kirayoglu et al. | |
| 5,314,742 A | 5/1994 | Kirayoglu et al. | |
| 5,514,444 A | 5/1996 | Buyny et al. | |
| 5,789,059 A | 8/1998 | Nomoto | |
| 5,833,807 A | 11/1998 | Ramachandran et al. | |
| 5,955,196 A * | 9/1999 | Sakellerides | 428/395 |
| 6,458,244 B1 | 10/2002 | Wang et al. | |
| 6,544,622 B1 | 4/2003 | Nomoto | |
| 6,551,456 B2 | 4/2003 | Wang et al. | |
| 6,929,848 B2 | 8/2005 | Samuels et al. | |
| 2002/0197466 A1* | 12/2002 | Ueno et al. | 428/322.2 |
| 2003/0082974 A1 | 5/2003 | Samuels et al. | |
| 2005/0085146 A1* | 4/2005 | Farkas et al. | 442/134 |

FOREIGN PATENT DOCUMENTS

GB 803.259 10/1958

* cited by examiner

*Primary Examiner*—Ling Xu

(57) ABSTRACT

This invention relates to a honeycomb including articles such as a panel or aerodynamic structure comprising matrix resin and paper, the paper comprising 50 to 80 parts by weight fibrous material having a modulus of 600 grams per denier (550 grams per dtex) or greater, 0 to 50 parts by weight powdered inorganic material, and 20 parts by weight or greater thermoplastic fiber, the improvement comprising the thermoplastic fiber is a binder for the paper and has a melting temperature above the curing temperature of the matrix resin; a glass transition temperature of greater than 100° C., and the weight average molecular weight of the thermoplastic polymer in the thermoplastic fibers changes 20% or less after being maintained for 10 minutes at the melting temperature.

12 Claims, 2 Drawing Sheets

HONEYCOMB FROM PAPER HAVING A HIGH MELT POINT THERMOPLASTIC FIBER

BACKGROUND OF THE INVENTION

1. Field of the Invention

This invention relates to an improved high modulus honeycomb comprising a matrix resin and paper that is made with a high melt point thermoplastic fiber binder that can withstand certain honeycomb manufacturing steps that utilize hot water or steam treatment. The thermoplastic fiber binder has a melting temperature above the curing temperature of the matrix resin, a glass transition temperature of greater than 100° C., and the weight average molecular weight of the thermoplastic polymer in the thermoplastic fibers changes 20% or less after being maintained for 10 minutes at the melting temperature.

2. Description of Related Art

Paper-based honeycomb is typically formed by (1) applying adhesive resin to sheets of paper along predetermined lines, called node lines, (2) adhering several sheets of paper along these node lines to form a stack, with the node lines of each sheet offset to the adjacent sheets, (3) expanding the stack to form a honeycomb having defined cell walls, (4) impregnating the cell walls of the honeycomb with structural resin by submerging the honeycomb in a liquid resin, and (5) curing the resin with heat. U.S. Pat. No. 5,137,768 to Lin, U.S. Pat. No. 5,789,059 to Nomoto, and U.S. Pat. No. 6,544,622 to Nomoto disclose honeycombs made from sheets made from high modulus para-aramid materials. These honeycombs are highly prized for structural applications due to their high stiffness and high strength to weight ratio. Generally these honeycombs are made from papers comprising para-aramid fibers, pulp, and/or other fibrous materials plus a binder. These patents disclose a variety of binders may be used and the use of low cost thermoplastic binders, such as polyester type binders, have been found to create a paper that has a very open or porous structure, allowing rapid impregnation of thermoset structural resin into the honeycomb walls when dipped in resin.

While not specifically used in honeycomb, U.S. Pat. Nos. 6,551,456 and 6,458,244 to Wang et al. and Japanese Patent Application Publication 61-58,193 to Nishimura et al., disclose papers made from aramid fibers combined with polyester fibers. It is believed that these papers also have a very open or porous structure, allowing rapid impregnation of thermoset structural resins.

British Patent No. 803,259 describes a process by which cellular structures (honeycombs) can be made from cellulosic sheets such as kraft paper by subjecting the stack of sheets with a vapor such as steam during or after expanding the sheets into cells. The '259 patent further describes the need to provide some support for honeycombs made with low wet strength paper while such papers dry. It is desired to use steam treatment process to help expand into honeycomb structures adhered paper sheets of high modulus fibrous materials and thermoplastic binders, however, the high temperature of the steam can either soften the thermoplastic binder causing undesired deformation of the honeycomb, or can liquefy the thermoplastic, which can flow and deposit on manufacturing equipment or in a worst case, further adhere the paper sheets together. In either case, the nature of the thermoplastic binder prevents the manufacture of a high quality honeycomb. Therefore, what is needed is a thermoplastic binder that provides adequate paper binding strength while at the same time can reliably withstand steam treatment during honeycomb manufacture.

BRIEF SUMMARY OF THE INVENTION

This invention relates to a honeycomb comprising matrix resin and paper, the paper comprising 50 to 80 parts by weight fibrous material having a modulus of 600 grams per denier (550 grams per dtex) or greater, 0 to 50 parts by weight powdered inorganic material, and 20 parts by weight or greater thermoplastic fiber, the improvement comprising the thermoplastic fiber is a binder for the paper and has a melting temperature above the curing temperature of the matrix resin; a glass transition temperature of greater than 100° C., and the weight average molecular weight of the thermoplastic polymer in the thermoplastic fibers changes 20% or less after being maintained for 10 minutes at the melting temperature.

One embodiment of this invention includes an article comprising the aforesaid honeycomb, with such articles including a panel or an aerodynamic structure.

DETAILED DESCRIPTION OF THE INVENTION

Figure 1A:
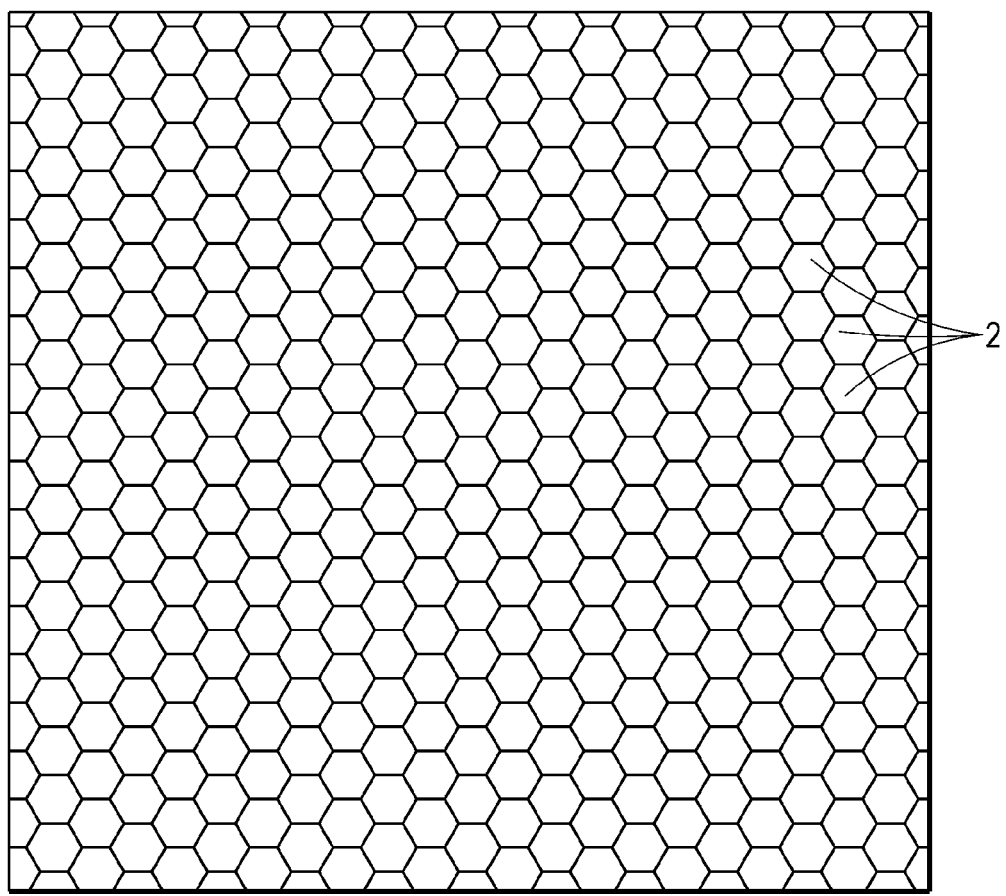
FIGS. 1a and 1b are representations of views of a hexagonal shaped honeycomb.
Figure 1B:
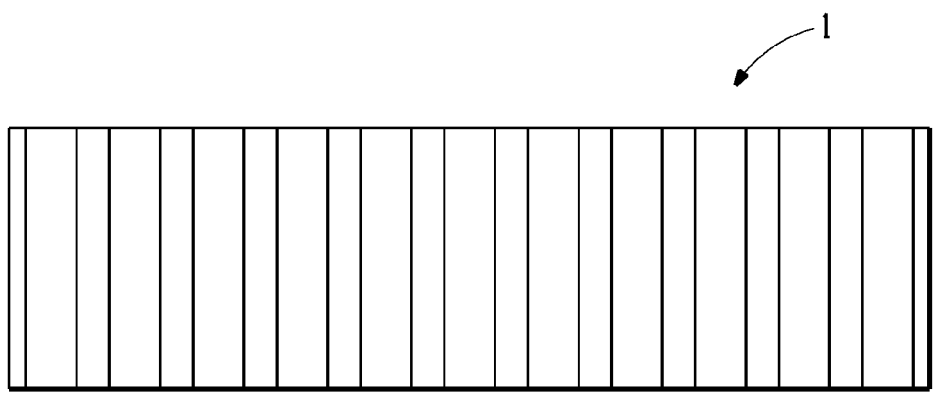
Figure 2:
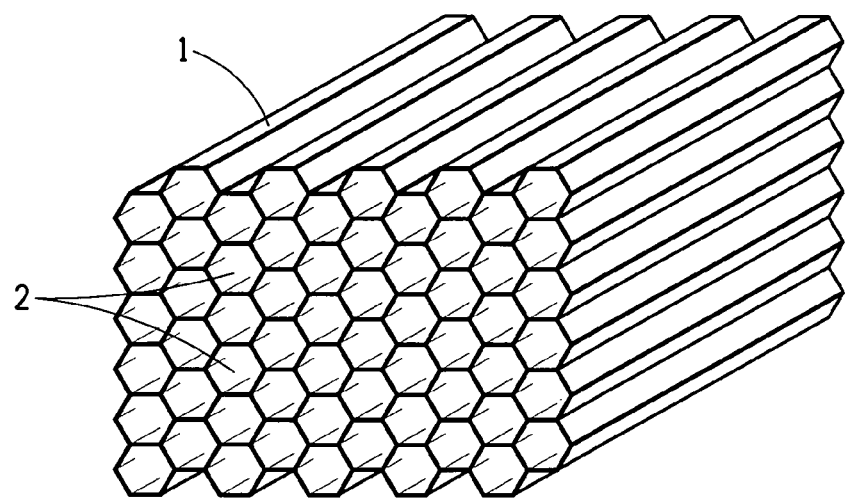
FIG. 2 is a representation of another view of a hexagonal cell shaped honeycomb.

This invention relates to a honeycomb made from a matrix resin and a paper comprising high modulus fiber and thermoplastic fiber wherein the thermoplastic fiber is a binder for the paper. FIG. 1a is one illustration of one honeycomb of this invention. FIG. 1b is an orthogonal view of the honeycomb shown in FIG. 1a and FIG. 2 is a three-dimensional view of the honeycomb. Shown is honeycomb 1 having hexagonal cells 2. Hexagonal cells are shown; however, other geometric arrangements are possible with square and flex-core cells being the other most common possible arrangements. Such cell types are well known in the art and reference can be made to Honeycomb Technology by T. Bitzer (Chapman & Hall, publishers, 1997) for additional information on possible geometric cell types.

The honeycomb of this invention includes a matrix resin, which is generally a resin that provides the honeycomb with improved structural or mechanical properties. In a preferred embodiment, the resin is a thermoset resin that fully impregnates, saturates, or coats the cell walls of the honeycomb. The resin is then further crosslinked or cured to realize the final properties (stiffness and strength) of the honeycomb. In some embodiments these structural resins include epoxy resins, phenolic resins, acrylic resins, polyimide resins, and mixtures thereof.

The cell walls of the honeycomb are preferably formed from a paper comprising a high modulus fiber and a thermoplastic binder. In some embodiments the term paper is employed in its normal meaning and refers to a nonwoven sheet prepared using conventional wet-lay papermaking processes and equipment. However, the definition of paper in some embodiments includes, in general, any nonwoven sheet that requires a binder material and has properties sufficient to provide an adequate honeycomb structure.

The paper used in the honeycomb of this invention comprises 20 parts by weight or greater thermoplastic fiber having a melting temperature above the curing temperature of the matrix resin used for the honeycomb. In addition, the thermoplastic fiber has a glass transition temperature of greater than 100° C. and the weight average molecular weight of the thermoplastic polymer in the thermoplastic fibers increases or decreases 20% or less after being maintained for 10 minutes at the melting temperature. The paper also has 50 to 80 parts by weight of a high modulus fiber having a modulus of 600 grams per denier (550 grams per dtex) or greater, and optionally has as much as 50 parts by weight of powdered inorganic material. In some embodiments the high modulus fibrous material is present in the paper in an amount of from about 60 to 80 parts by weight, and in some embodiments the thermoplastic fiber is present in the paper in an amount of from 20 to 40 parts by weight. All parts are based on the total amount of thermoplastic fiber, high modulus fibrous material, and inorganic powder in the paper.

Inorganic powder is meant to include inorganic particles and representative particles include mica, vermiculite, and the like; the addition of these particles can impart properties such as improved fire resistance, thermal conductivity, dimensional stability, and the like to the paper and the final honeycomb.

The paper used in this invention can be formed on equipment of any scale, from laboratory screens to commercial-sized papermaking machinery, including such commonly used machines as Fourdrinier or inclined wire paper machines. A typical process involves making a dispersion of high modulus fibrous material such as floc and/or pulp and thermoplastic binder fiber in an aqueous liquid, draining the liquid from the dispersion to yield a wet composition and drying the wet paper composition. The dispersion can be made either by dispersing the high modulus fibrous material and then adding the thermoplastic binder fiber or by dispersing the thermoplastic binder fiber and then adding the high modulus fibrous material. The final dispersion can also be made by combining a dispersion of high modulus fibrous material with a dispersion of thermoplastic binder fiber. Alternatively, a fibrous mixture of the high modulus fibrous material and thermoplastic binder fiber can be first formed and this mixture is added to an aqueous liquid to form a dispersion. The dispersion can also include optional additives such as inorganic materials or other binders for the paper, if desired. The concentration of fiber in the dispersion can range from about 0.01 to 1.0 weight percent based on the total weight of the dispersion. In some embodiments, the concentration of a binder in the dispersion is preferably up to 50 weight percent based on the total weight of solids. In a typical process, the aqueous liquid of the dispersion is generally water, but may include various other materials such as pH-adjusting materials, forming aids, surfactants, defoamers and the like. The aqueous liquid is usually drained from the dispersion by conducting the dispersion onto a screen or other perforated support, retaining the dispersed solids and then passing the liquid to yield a wet paper composition. The wet composition, once formed on the support, is usually further dewatered by vacuum or other pressure forces and further dried by evaporating the remaining liquid.

In one preferred embodiment high modulus fibrous material and a thermoplastic fiber can be slurried together to form a mix that is converted to paper on a wire screen or belt. Reference is made to U.S. Pat. No. 3,756,908 to Gross; U.S. Pat. Nos. 4,698,267 and 4,729,921 to Tokarsky; U.S. Pat. No. 5,026,456 to Hesler et al.; U.S. Pat. No. 5,223,094 to Kirayoglu et al.; U.S. Pat. No. 5,314,742 to Kirayoglu et al.; U.S. Pat. Nos. 6,458,244 and 6,551,456 to Wang et al.; and U.S. Pat. No. 6,929,848 and 2003-0082974 to Samuels et al. for illustrative processes for forming papers from various types of fibrous material and binders.

Once the paper is formed, it is preferably hot calendered. This can increase the density and strength of the paper. Generally one or more layers of the paper are calendered in the nip between metal-metal, metal-composite, or composite-composite rolls. Alternatively, one or more layers of the paper can be compressed in a platen press at a pressure, temperature, and time that are optimal for a particular composition and final application. Calendering paper in this manner also decreases the porosity of the formed paper, and in some preferred embodiments the paper used in the honeycomb is calendered paper. Heat-treatment of the paper, such as from radiant heaters or un-nipped rolls, as an independent step before, after, or instead of calendering or compression, can be conducted if strengthening or some other property modification is desired without, or in addition to, densification.

The thickness of the paper is dependent upon the end use or desired properties of the honeycomb and in some embodiments is typically from 1 to 5 mils (25 to 130 micrometers) thick. In some embodiments, the basis weight of the paper is from 0.5 to 6 ounces per square yard (15 to 200 grams per square meter).

The term "fibrids" as used herein, means a very finely-divided polymer product of small, filmy, essentially two-dimensional particles having a length and width on the order of 100 to 1000 micrometers and a thickness only on the order of 0.1 to 1 micrometer. Fibrids are typically made by streaming a polymer solution into a coagulating bath of liquid that is immiscible with the solvent of the solution. The stream of polymer solution is subjected to strenuous shearing forces and turbulence as the polymer is coagulated.

The honeycomb comprises high modulus fibrous material; as used herein high modulus fibrous materials are typically fibers having, or in the case of pulp, having been made from a fibers having a tensile or Young's modulus of 600 grams per denier (550 grams per dtex) or greater. High modulus of the fiber provides necessary stiffness of the final honeycomb structure and corresponding panel. In the preferred embodiment of this invention, Young's modulus of the fiber is 900 grams per denier (820 grams per dtex) or greater. In the preferred embodiment, the fiber tenacity is at least 21 grams per denier (19 grams per dtex) and its elongation is at least 2% so as to provide a high level of mechanical properties to the final honeycomb structure.

In a preferred embodiment the high modulus fibrous material is heat resistant fiber. By "heat resistant fiber" it is meant that the fiber preferably retains 90 percent of its fiber weight when heated in air to 500° C. at a rate of 20 degrees Celsius per minute. Such fiber is normally flame resistant, meaning the fiber or a fabric made from the fiber has a Limiting Oxygen Index (LOI) such that the fiber or fabric will not support a flame in air, the preferred LOI range being about 26 and higher.

The high modulus fibrous material can be in the form of a floc or a pulp or a mixture thereof. By "floc" is meant fibers having a length of 2 to 25 millimeters, preferably 3 to 7 millimeters and a diameter of 3 to 20 micrometers, preferably 5 to 14 micrometers. Floc is generally made by cutting continuous spun filaments into specific-length pieces. If the floc length is less than 2 millimeters, it is generally too short to provide a paper with adequate strength; if the floc length is more than 25 millimeters, it is very difficult to form uniform wet-laid webs. Floc having a diameter of less than 5 micrometers, and especially less than 3 micrometers, is difficult to produce with adequate cross sectional uniformity and reproducibility; if the floc diameter is more than 20 micrometers, it is very difficult to form uniform papers of light to medium basis weights.

The term "pulp", as used herein, means particles of high modulus material having a stalk and fibrils extending generally therefrom, wherein the stalk is generally columnar and about 10 to 50 micrometers in diameter and the fibrils are fine, hair-like members generally attached to the stalk measuring only a fraction of a micrometer or a few micrometers in diameter and about 10 to 100 micrometers long.

In some embodiments, the high modulus fibers useful in this invention include fiber made from para-aramid, polybenzazole, polypyridazole polymer or mixtures thereof. In some embodiments, the high modulus fibers useful in this invention include carbon fiber. In one preferred embodiment, the high modulus fiber is made from aramid polymer, especially para-aramid polymer. In an especially preferred embodiment the high modulus fiber is poly(paraphenylene terephthalamide).

As employed herein the term aramid means a polyamide wherein at least 85% of the amide (—CONH—) linkages are attached directly to two aromatic rings. "Para-aramid" means the two rings or radicals are para oriented with respect to each other along the molecular chain. Additives can be used with the aramid. In fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. In some embodiments the preferred para-aramid is poly(paraphenylene terephthalamide). Methods for making para-aramid fibers useful in this invention are generally disclosed in, for example, U.S. Pat. Nos. 3,869,430; 3,869,429; and 3,767,756. Such aromatic polyamide fibers and various forms of these fibers are available from E.I. du Pont de Nemours and Company, Wilmington, Del. under the trademark Kevlar® fibers and from Teijin, Ltd., under the trademark Twaron®.

Commercially available polybenzazole fibers useful in this invention include Zylon® PBO-AS (Poly(p-phenylene-2,6-benzobisoxazole) fiber, Zylon® PBO-HM (Poly(p-phenylene-2,6-benzobisoxazole)) fiber, available from Toyobo, Japan. Commercially available carbon fibers useful in this invention include Tenax® fibers available from Toho Tenax America, Inc.

The honeycomb of this invention has at least 20 parts by weight thermoplastic fiber that has a melting temperature above the curing temperature of the matrix resin. These thermoplastic fibers used in the papers of this invention act as a binder for the paper and soften, melt or flow during the formation and calendering of the paper, but do not appreciably melt or flow during the manufacture of honeycomb, particularly those manufacturing steps that require heat to expand the honeycomb and provide and cure the honeycomb with a matrix resin. In some preferred embodiments, the thermoplastic fiber has a melting point of greater than 200° C. In some preferred embodiments the melting point of the thermoplastic is from 250° to 300° C. Thermoplastics having a melt point above 350° C. are undesired in many embodiments because they require such high temperatures to soften that other components in the paper may begin to degrade during paper manufacture. In those embodiments where more than one type of thermoplastic fiber is present then at least 30% of the thermoplastic fiber should have melting point not above 350° C. Thermoplastic is meant to have its traditional polymer definition; these materials flow in the manner of a viscous liquid when heated and solidify when cooled and do so reversibly time and time again on subsequent heating and cooling steps. Melting points are measured by ASTM Method D3418. Melting points are taken as the maximum of the melting endotherm, and are measured on the second heat at a heating rate of 10 degrees Celsius per minute. If more than one melting point is present the melting point of the polymer is taken as the highest of the melting points.

The thermoplastic fiber comprises a thermoplastic polymer that has a glass transition temperature of greater than 100° C. In some preferred embodiments, the glass transition temperature of the thermoplastic polymer is 125° C. or greater. In some most preferred embodiments the thermoplastic polymer has a glass transition temperature of 200° C. or greater. Thermoplastic fibers made from thermoplastic polymers having a glass transition temperature of greater than 100° C. are useful as binders for papers while surviving low pressure steam treatment during honeycomb manufacture without appreciably softening or melting. Selection of the thermoplastic fiber is dependent on the final properties of the material and the balance of heat required to form and calender the paper versus the temperature the paper will see during honeycomb manufacture.

The thermoplastic fibers have a degree of stability in the melt. By degree of stability in the melt, it is meant that the process of melting the thermoplastic, maintaining the melt at the melt temperature for a certain time, and then re-solidifying the thermoplastic does not substantially change the weight average molecular weight of the polymer. The weight average molecular weight of thermoplastic polymers can be very sensitive to thermal effects. Depending on particular chemical structure of the thermoplastic and other factors, exposure to temperatures near, at, or above the melt point temperature can cause a reduction in molecular weight, generally due to decomposition of the polymer, or can cause an increase in molecular weight, generally due to cross-linking. Any major change in weight average molecular weight will result in corresponding changes in other properties of the thermoplastic. Therefore, in this invention, the weight average molecular weight of the thermoplastic polymer in the thermoplastic fibers increases or decreases 20% or less after being maintained for 10 minutes at the melting temperature. In a preferred embodiment, the process of melting, maintaining the melt at the melt temperature for 10 minutes, and then re-solidifying the melt results in a change (increase or decrease) of 15% or less in weight average molecular weight.

In some embodiments of this invention, the preferred thermoplastic fiber is made from polyamides or polyesters having adequate crystallinity or orientation to have a Tg of greater than 100° C. In some embodiments, the thermoplastic fiber useful in this invention can be selected from the group consisting of polyolefin, polyimide, polyetherketone, polyamide-imide, polyether-imide, and mixtures thereof. In some preferred embodiments the polyester fiber comprises polyethylene naphthalate (PEN) polymers. Useful polyester polymers can include a variety of comonomers, including diethylene glycol, cyclohexanedimethanol, poly(ethylene glycol), glutaric acid, azelaic acid, sebacic acid, isophthalic acid, and the like. In addition to these comonomers, branching agents like trimesic acid, pyromellitic acid, trimethylolpropane and trimethyloloethane, and pentaerythritol may be used. The PET may be obtained by known polymerization techniques from either terephthalic acid or its lower alkyl esters (e.g. dimethyl terephthalate) and ethylene glycol or blends or mixtures of these. PEN may be obtained by known polymerization techniques from 2,6-naphthalene dicarboxylic acid and ethylene glycol.

In some embodiments, the polyester binder fiber is made from thermotropic or liquid crystalline polyester. By a "liquid crystalline polyester" (LCP) herein is meant a polyester polymer that is anisotropic when tested using the TOT test or any reasonable variation thereof, as described in U.S. Pat. No. 4,118,372, which is hereby included by reference. One preferred form of LCP polymer is "all aromatic", that is all of the groups in the polymer main chain are aromatic (except for the linking groups such as ester groups), but side groups that are not aromatic may be present. LCP material that is particularly useful as a thermoplastic binder in this invention has a melting point up to 350° C. A preferred LCP for this invention include corresponding grades of Zenite® available from E.I. du Pont de Nemours and Company, and Vectra® LCP available from Ticona Co.

Other materials, particularly those often found in or made for use in thermoplastic compositions may also be present in the thermoplastic fiber. These materials should preferably be chemically inert and reasonably thermally stable under the operating environment of the honeycomb. Such materials may include, for example, one or more of fillers, reinforcing agents, pigments and nucleating agents. Other polymers may also be present, thus forming polymer blends. In some embodiments, other polymers are present it is preferred that they are less than 25 weight percent of the composition. In another preferred embodiment, other polymers are not present in the thermoplastic fiber except for a small total amount (less than 5 weight percent) of polymers such as those that function as lubricants and processing aids.

Another embodiment of this invention is an article comprising a honeycomb made from a paper comprising high modulus fiber and thermoplastic fiber wherein the thermoplastic fiber is a binder for the paper and has a melting temperature above the curing temperature of the matrix resin, a glass transition temperature of greater than 100° C., and the weight average molecular weight of the thermoplastic polymer in the thermoplastic fibers increases or decreases 20% or less after being maintained for 10 minutes at the melting temperature. When used in articles the honeycomb can function, if desired, as a structural component. In some preferred embodiments, the honeycomb is used at least in part in an aerodynamic structure. In some embodiments, the honeycomb has use as a structural component in such things as overhead storage bins and wing to body fairings on commercial airliners. Due to the lightweight structural properties of honeycomb, one preferred use is in aerodynamic structures wherein lighter weights allow savings in fuel or the power required to propel an object through the air.

Figure 3:
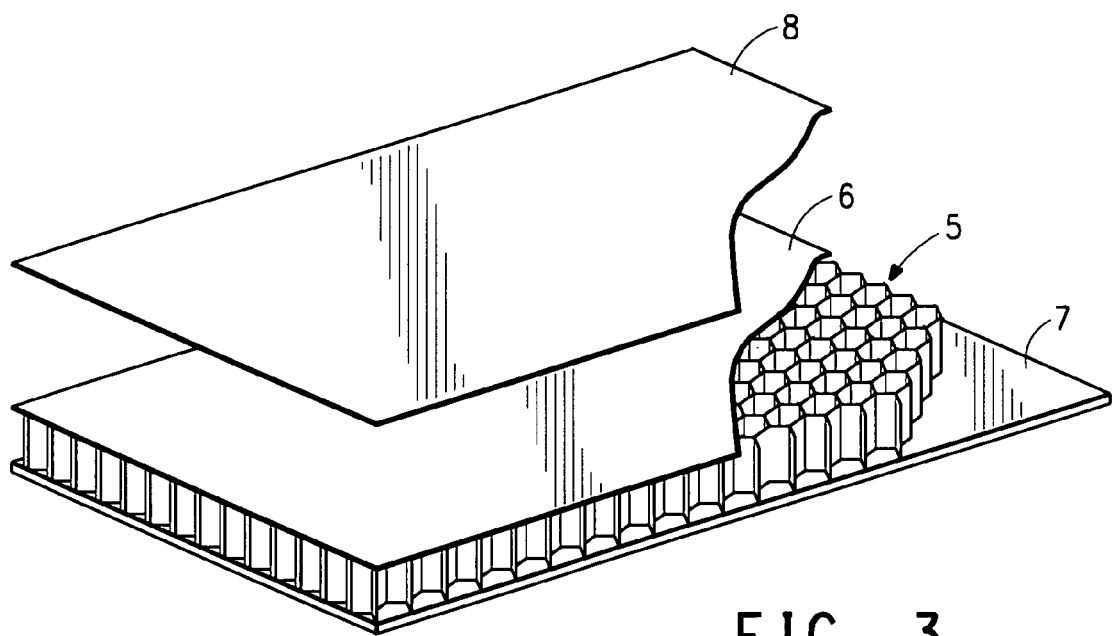
FIG. 3 is an illustration of honeycomb provided with facesheet(s).

Another embodiment of this invention is a panel comprising a honeycomb made from a paper comprising high modulus fiber and thermoplastic fiber wherein the thermoplastic fiber is a binder for the paper and has a melting temperature above the curing temperature of the matrix resin, a glass transition temperature of greater than 100° C., and the weight average molecular weight of the thermoplastic polymer in the thermoplastic fibers increases or decreases 20% or less after being maintained for 10 minutes at the melting temperature. One or more facesheets may be attached to the face of the honeycomb of this invention to form a panel. Facesheets provide integrity to the structure and help to realize the mechanical properties of the honeycomb core. Also, facesheets can seal the cells of the honeycomb to prevent material from the cells, or the facesheets can help retain material in the cells. FIG. 3 shows honeycomb 5 having a facesheet 6 attached to one face by use of an adhesive. A second facesheet 7 is attached to the opposing face of the honeycomb, and the honeycomb with the two opposing facesheets attached form a panel. Additional layers of material 8 can be attached to either side of the panel as desired. In some preferred embodiments face sheets applied to both sides of the honeycomb contain two layers of material. In some preferred embodiments, the facesheet comprises a woven fabric or a crossplied unidirectional fabric. In some embodiments crossplied unidirectional fabric is a 0/90 crossply. If desired, the facesheet can have a decorative surface, such as embossing or other treatment to form an outer surface that is pleasing to the eye. Fabrics containing glass fiber and/or carbon fiber are useful as facesheet material.

In some embodiments the honeycomb can be made by methods such as those described in U.S. Pat. Nos. 5,137,768; 5,789,059; 6,544,622; 3,519,510; and 5,514,444. These methods for making honeycomb generally require the application or printing of a number of lines of adhesive (node lines) at a certain width and pitch on one surface of the high modulus paper, followed by drying of the adhesive. Typically the adhesive resin is selected from epoxy resins, phenolic resins, acrylic resins polyimide resins and other resins, however, it is preferred that a thermoset resin be used.

After application of node lines, the high modulus paper is cut at a predetermined interval to form a plurality of sheets. The cut sheets are piled one on top of the other such that each of the sheets is shifted to the other by half a pitch or a half the interval of the applied adhesive. The piled high modulus fiber-containing paper sheets are then bonded to each other along the node lines by the application of by pressure and heat. The bonded sheets are then pulled apart or expanded in directions perpendicular to the plane of the sheets to form a honeycomb having cells. In the case of relatively thick paper having a thickness of 3 mils or above (75 micrometers or above) this is accomplished by spraying, pouring, or contacting the block of bonded sheets with steam or hot water while the block of bonded sheets is being expanded. Consequently, the formed honeycomb cells are composed of a planar assembly of hollow, columnar cells separated by cell walls made of paper sheets that were bonded to each other along a number of lines and which were expanded.

In some embodiments, the honeycomb is then typically impregnated with a structural resin after it is expanded. Typically this is accomplished by dipping the expanded honeycomb into a bath of thermoset resin, however, other resins or means such as sprays could be employed to coat and fully impregnate and/or saturate the expanded honeycomb. After the honeycomb is fully impregnated with resin, the resin is then cured by heating the saturated honeycomb to crosslink the resin. Generally this temperature is in the range of 150° to 180° C. for many thermoset resins.

The honeycomb before or after resin impregnation and curing, may be cut into slices. In this way, multiple thin sections or slices of honeycomb can be obtained from a large block of honeycomb. The honeycomb is generally sliced perpendicular to the plane of the cell edges so that the cellular nature of the honeycomb is preserved.

The honeycomb of this invention can further comprise inorganic particles, and depending on the particle shape, the particular paper composition, and/or other reasons, these particles can be incorporated into the paper during papermaking (for example, mica flakes, vermiculite, and the like) or into they may be incorporated into the matrix or structural resin (for example, silica powder, metal oxides, and the like.)

Test Methods

The glass transition temperature (Tg) and melting point temperature (Tm) are measured using ASTM D3418. Melting points are taken as the maximum of the melting endotherm, and are measured on the second heat at a heating rate of 10° C./min. If more than one melting point is present the melting point of the polymer is taken as the highest of the melting points.

Fiber denier is measured using ASTM D1907. Fiber modulus is measured using ASTM D885. Paper density is calculated using the paper thickness as measured by ASTM D374 and the basis weight as measured by ASTM D646.

Weight average molecular weight Mw is defined as:

$$Mw=\Sigma[Ni*Mi^2]/\Sigma[Ni*Mi]$$

where Ni is the number of molecules of molecular weight Mi for every species i.

Weight average molecular weight is measured by light scattering in accordance with ASTM D4001. An appropriate solvent should be used for each particular thermoplastic.

For LCP, such solvent can consist of 60/40 (by weight) blend of pentaflurophenol/1,2,4-trichlorobenzene as described on page 220 of Thermotropic Liquid Crystal Polymers; Thin-Film Polymerization, Characterization, Blends, and Applications edited by Tai-Shung Chung (Technomic Publishing Company, Inc, 2001

The change in weight average molecular weight is determined by comparing the weight average molecular weight of the polymer measured before and after a melting cycle; by melting cycle is meant the thermoplastic is brought to the melting temperature, maintained at the melting temperature for 10 minutes, and cooled to re-solidify the thermoplastic.

EXAMPLE

Strand cut pellets of LCP are refined on a 30.5 cm diameter Sprout-Waldron type C-2976-A single rotating disc refiner in one pass with the gap between the plates being about 25 micrometers, a feed speed of about 60 g/min. and continuous addition of water in quantity of about 4 kg of water per 1 kg of the pellets. The resulting LCP pulp is additionally refined in a Bantam® Micropulverizer, Model CF, to pass through a 30 mesh screen. The LCP has the composition disclosed in Example 5 of U.S. Pat. No. 5,110,896, derived from hydroquinone/4,4'-biphenol/terephthalic acid/2,6-naphthalenedicarboxylic acid/4-hydroxybenzoic acid in molar ratio 50/50/70/30/350. No glass transition can be observed for this LCP, and its melting point is about 340° C.

An aramid/thermoplastic paper having a composition of 50 weight percent para-aramid floc and 50 weight percent LCP pulp is formed on conventional wet-lay paper forming equipment with a drying section consisting of a thru-air dryer operating at an air temperature of about 338 C. The paper therefore contains 50 weight percent high modulus fiber and 50 weight percent thermoplastic fiber. The para-aramid floc is poly (para-phenylene terephthalamide) fiber sold by E.I. du Pont de Nemours and Company of Wilmington, Del. (DuPont) under the trademark KEVLAR® 49 and has a nominal filament linear density of 1.5 denier per filament (1.7 dtex per filament) and a nominal cut length of 6.7 mm. This fiber has a tensile modulus of about 930 grams per denier (850 grams per dtex), a tensile strength of about 24 grams per denier (22 grams per dtex), and an elongation of about 2.5 percent. After forming, the paper is calendered at ambient temperature between two metal rolls at linear pressure of about 6500 N/cm. The final paper has a basis weight of 85 g/m² and a thickness of about 4.1 mils (102 micrometers).

A honeycomb is then formed from the calendered paper in the following manner. Node lines of adhesive resin are applied to the paper surface with the width of the lines of adhesive being 2.67 mm. The pitch, or the linear distance between the start of one line and the next line, is 8.0 mm. The adhesive resin is a 50% solids solution comprising 70 parts by weight of an epoxy resin identified as Epon 826 sold by Shell Chemical Co.; 30 parts by weight of an elastomer-modified epoxy resin identified as Heloxy WC 8006 sold by Wilmington Chemical Corp, Wilmington, Del., USA; 54 parts by weight of a bisphenol A-formaldehyde resin curing agent identified as UCAR BRWE 5400 sold by Union Carbide Corp.; 0.6 parts by weight of 2-methylimidazole as a curing catalyst, in a glycol ether solvent identified as Dowanol PM sold by The Dow Chemical Company; 7 parts by weight of a polyether resin identified as Eponol 55-B-40 sold by Miller-Stephenson Chemical Co.; and 1.5 parts by weight of fumed silica identified as Cab-O-Sil sold by Cabot Corp. The adhesive is partially dried on the paper in an oven at 130° C. for 6.5 minutes.

The sheet with the adhesive node lines is cut parallel to the node lines to form 50 smaller sheets. The cut sheets are stacked one on top of the other, such that each of the sheets is shifted to the other by half a pitch or a half the interval of the applied adhesive node lines. The shift occurs alternately to one side or the other, so that the final stack is uniformly vertical. The stack of sheets is then hot-pressed at 345 kPa at a first temperature of 140° C. for 30 minutes and then at a temperature of 177° C. for 40 minutes, causing the adhesive node lines to melt; once the heat is removed the adhesive then hardens to bond the sheets with each other.

Using an expansion frame, the bonded aramid sheets are then expanded in the direction counter to the stacking direction to form cells having an equilateral cross section. Each of the sheets are extended between each other such that the sheets are folded along the edges of the bonded node lines and the portions not bonded are extended in the direction of the tensile force to separate the sheets from each other. To make the expansion process easier, the honeycomb is treated with hot water having temperature of about 90° C. immediately after slight opening of the cells. Water is plasticizing the sheet similar to what was described in British Patent No. 803,259. Such treatment is repeated several times at different degrees of the expansion until a full expansion is achieved. The expanded honeycomb is placed in the oven at 120° C. for 2 hours for drying. No defects are observed in the expanded and dried honeycomb.

The honeycomb is then placed in an impregnating bath containing solution of phenolic resin PLYOPHEN 23900 from the Durez Corporation. After impregnating with resin, the honeycomb is taken out from the bath and is dried in a drying furnace using hot air. The honeycomb is heated from room temperature to 82° C. in this manner and then this temperature is maintained for 15 minutes. The temperature is then increased to 121° C. and this temperature is maintained for another 15 minutes, followed by increasing the temperature to 182° C. and holding at this temperature for 60 minutes. The expansion frame is then removed. After that, the impregnation and drying processes are repeated for a total of 12 times. The final honeycomb has a bulk density of about 130 kg/m³.

COMPARATIVE EXAMPLE

Polyester fibrids are obtained from the process described in U.S. Pat. No. 2,999,788, example 176, using a co-polymer containing 80% ethylene terephthalate units and 20% of ethylene isophthalate units with a glass transition temperature of about 70° C. The average thickness of a fibrid is about 1 micron, the minimum dimension in the filmy plane of the fibrid is about 40 micrometers, and maximum dimension in plane is about 1.3 mm.

An aramid/thermoplastic paper having a composition of 50 weight percent para-aramid floc of Example 1 and 50 weight percent polyester fibrids is formed on conventional wet-lay paper forming equipment with a drying section consisting of a thru-air dryer operating at an air temperature of about 255° C. The paper therefore contains 50 weight percent high modulus fiber and 50 weight percent thermoplastic fiber.

The paper is calendered as in Example 1 and the final paper has basis weight of about 85 g/m$^2$ and thickness of about 4.1 mils (102 micrometers).

A honeycomb is made as described in Example 1. However, after the expansion with hot water, there are numerous defects in the cell structure, including holes, thin and thick areas in the walls, and para-aramid fibers protruding from the walls. As a result, no useable honeycomb is obtained.

What is claimed is:

1. A honeycomb comprising matrix resin and paper, the paper consisting of 50 to 80 parts by weight high modulus fibrous material having a modulus of 600 grams per denier (550 grams per dtex) or greater, 0 to 50 parts by weight powdered inorganic material, and 20 parts by weight or greater thermoplastic fiber, wherein
   the thermoplastic fiber is a binder for the paper during the formation and calendering of the paper and has
   i) a melting temperature above the curing temperature of the matrix resin,
   ii) a glass transition temperature of greater than 100° C.; and
   wherein the weight average molecular weight of the thermoplastic polymer in the thermoplastic fibers changes 20% or less after being maintained for 10 minutes at the melting temperature.

2. The honeycomb of claim 1 wherein the thermoplastic fiber is present in an amount of from 20 to 40 parts by weight.

3. The honeycomb of claim 1 wherein the high modulus fibrous material comprises para-aramid fiber.

4. The honeycomb of claim 3 wherein the para-aramid fiber is poly (paraphenylene terephthalamide) fiber.

5. The honeycomb of claim 1 wherein the high modulus fibrous material is selected from the group of polybenzazole fiber, polypyridazole fiber, carbon fiber, and mixtures thereof.

6. The honeycomb of claim 1 wherein the thermoplastic fiber comprises polyethylene naphthalate.

7. The honeycomb of claim 1 wherein the thermoplastic fiber comprises polyamide.

8. The honeycomb of claim 1 wherein the thermoplastic fiber is selected from the group consisting of polyolefin, polyimide, polyetherketone, polyamide-imide, polyetherimide, and mixtures thereof.

9. The honeycomb of claim 1 wherein the powdered inorganic material is mica, vermiculite, silica, or glass.

10. An article comprising the honeycomb of claim 1.

11. An aerodynamic structure comprising the honeycomb of claim 1.

12. A panel comprising the honeycomb of claim 1 and a facesheet attached to a face of the honeycomb.

* * * * *